United States Patent
Yu et al.

(10) Patent No.: US 12,480,781 B2
(45) Date of Patent: Nov. 25, 2025

(54) CROWD-SOURCING LANE LINE MAPS FOR A VEHICLE

(71) Applicant: GM Global Technology Operations LLC, Detroit, MI (US)

(72) Inventors: Bo Yu, Troy, MI (US); Gui Chen, Sterling Heights, MI (US); Fan Bai, Ann Arbor, MI (US); Shuqing Zeng, Sterling Heights, MI (US); Joon Hwang, Pflugerville, TX (US); Mason David Gemar, Cedar Park, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 279 days.

(21) Appl. No.: 18/359,017

(22) Filed: Jul. 26, 2023

(65) Prior Publication Data

US 2025/0035463 A1 Jan. 30, 2025

(51) Int. Cl.
*B60W 60/00* (2020.01)
*G01C 21/00* (2006.01)

(52) U.S. Cl.
CPC ....... *G01C 21/3815* (2020.08); *B60W 60/001* (2020.02); *G01C 21/3841* (2020.08); *G01C 21/3896* (2020.08); *B60W 2552/53* (2020.02); *B60W 2556/40* (2020.02); *B60W 2556/45* (2020.02)

(58) Field of Classification Search
None
See application file for complete search history.

(56) References Cited

U.S. PATENT DOCUMENTS

| 11,326,889 B2 | 5/2022 | Kim |
| 2004/0114379 A1 | 6/2004 | Miller et al. |
| 2014/0324339 A1 | 10/2014 | Adam et al. |

(Continued)

FOREIGN PATENT DOCUMENTS

WO 2019207160 A1 10/2019

OTHER PUBLICATIONS

Song, H., et al. "A Lightweight High Definition Mapping Method Based on Multi-Source Data Fusion Perception," Applied Sciences, 2023, vol. 13, pp. 1-17.

(Continued)

*Primary Examiner* — Hunter B Lonsberry
*Assistant Examiner* — Robert L Pinkerton
(74) *Attorney, Agent, or Firm* — Vivacqua Crane, PLLC

(57) ABSTRACT

A method for crowd-sourcing lane line map data for a vehicle includes receiving a plurality of observations. The method also includes classifying the plurality of observations into a plurality of observation categories. Each of the plurality of observation categories includes at least one of the plurality of observations. The method also includes determining a plurality of aligned point clouds based at least in part on the plurality of observations. One of the plurality of aligned point clouds corresponds to each of the plurality of observation categories. The method also includes determining a plurality of lane line maps based at least in part on the plurality of aligned point clouds. One of the plurality of lane line maps corresponds to each of the plurality of aligned point clouds. The method also includes updating a map database based at least in part on the plurality of lane line maps.

20 Claims, 8 Drawing Sheets

(56) References Cited

U.S. PATENT DOCUMENTS

| | | |
|---|---|---|
| 2016/0102986 A1* | 4/2016 | Ma .................. G01C 21/3841 |
| | | 702/5 |
| 2018/0154901 A1 | 6/2018 | Hasberg et al. |
| 2019/0122386 A1 | 4/2019 | Wheeler et al. |
| 2019/0154842 A1 | 5/2019 | Adachi |
| 2020/0249332 A1 | 8/2020 | Pandey et al. |
| 2020/0363218 A1 | 11/2020 | Kim |
| 2020/0380270 A1* | 12/2020 | Cox .................. G06F 18/2413 |
| 2021/0158547 A1* | 5/2021 | He ........................ G01S 17/89 |
| 2021/0370968 A1 | 12/2021 | Xiao et al. |
| 2022/0163346 A1 | 5/2022 | Han et al. |
| 2022/0198706 A1* | 6/2022 | Su ...................... G01C 21/3602 |
| 2022/0205783 A1* | 6/2022 | Chen ................... G06V 20/58 |
| 2022/0282990 A1* | 9/2022 | Reuveni ............... G05D 1/0246 |
| 2023/0034574 A1 | 2/2023 | Xie et al. |
| 2023/0060542 A1* | 3/2023 | Friedrich ............ B60W 60/001 |
| 2023/0148050 A1 | 5/2023 | Lv et al. |
| 2023/0196759 A1 | 6/2023 | Hong |
| 2024/0011794 A1 | 1/2024 | Song et al. |
| 2024/0182035 A1* | 6/2024 | Lin .................. B60W 30/0956 |
| 2024/0317254 A1* | 9/2024 | Tran .................... G06V 20/588 |

OTHER PUBLICATIONS

U.S. Appl. No. 17/930,503, filed Sep. 8, 2022.
U.S. Appl. No. 18/171,848, filed Feb. 21, 2023.
U.S. Appl. No. 18/318,247, filed May 16, 2023.

* cited by examiner

CROWD-SOURCING LANE LINE MAPS FOR A VEHICLE

The present disclosure relates to advanced driver assistance and automated driving systems and methods for vehicles.

To increase occupant awareness and convenience, vehicles may be equipped with advanced driver assistance systems (ADAS) and/or automated driving systems (ADS). ADAS systems may use various sensors such as cameras, radar, and LiDAR to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. However, current ADAS systems may not account for additional factors which may affect occupant experience. ADS systems may use various sensors to detect objects in the environment around the vehicle and control the vehicle to navigate the vehicle through the environment to a predetermined destination. However, current ADAS and ADS systems may rely on accurate interpretation of road markings, such as, for example, lane markings, for optimal operation.

Thus, while ADAS and ADS systems and methods achieve their intended purpose, there is a need for a new and improved system and method for crowd-sourcing lane line map data for a vehicle.

SUMMARY

According to several aspects, a method for crowd-sourcing lane line map data for a vehicle is provided. The method includes receiving a plurality of observations. The method also includes classifying the plurality of observations into a plurality of observation categories. Each of the plurality of observation categories includes at least one of the plurality of observations. The method also includes determining a plurality of aligned point clouds based at least in part on the plurality of observations. One of the plurality of aligned point clouds corresponds to each of the plurality of observation categories. The method also includes determining a plurality of lane line maps based at least in part on the plurality of aligned point clouds. One of the plurality of lane line maps corresponds to each of the plurality of aligned point clouds. The method also includes updating a map database based at least in part on the plurality of lane line maps.

In another aspect of the present disclosure, receiving the plurality of observations further may include receiving the plurality of observations from one or more vehicles. Each of the plurality of observations includes a vehicle location trajectory and a plurality of points positioned relative to the vehicle location trajectory. Each point of the plurality of points includes a plurality of point characteristics. One of the plurality of point characteristics is a location of each point relative to the vehicle location trajectory. Where each of the plurality of points corresponds to an object in an environment surrounding the one or more vehicles.

In another aspect of the present disclosure, classifying the plurality of observations further may include filtering the plurality of observations to remove outlier observations.

In another aspect of the present disclosure, classifying the plurality of observations further may include determining at least one observation characteristic of each of the plurality of observations based at least in part on the plurality of point characteristics of each of the plurality of points of each of the plurality of observations. Classifying the plurality of observations further may include classifying the plurality of observations based at least in part on the at least one observation characteristic. Each of the plurality of observation categories includes a subset of the plurality of observations having the at least one observation characteristic in common.

In another aspect of the present disclosure, classifying the plurality of observations further may include determining an average vehicle heading of each of the plurality of observations based at least in part on the plurality of point characteristics of each of the plurality of points of each of the plurality of observations. Classifying the plurality of observations further may include classifying the plurality of observations based at least in part on the average vehicle heading of each of the plurality of observations. Each of the plurality of observation categories includes a subset of the plurality of observations having an average vehicle heading within a predetermined heading tolerance range.

In another aspect of the present disclosure, determining one of the plurality of aligned point clouds further may include identifying a first of the plurality of observations. The first of the plurality of observations is in a first observation category of the plurality of observation categories. Determining one of the plurality of aligned point clouds further may include selecting a second of the plurality of observations. The second of the plurality of observations is in the first observation category. Determining one of the plurality of aligned point clouds further may include aligning the second of the plurality of observations with the first of the plurality of observations by shifting the vehicle location trajectory of the second of the plurality of observations to produce a shifted vehicle location trajectory. Determining one of the plurality of aligned point clouds further may include forming a point cloud by repeating the selecting step and the aligning step until each of the plurality of observations of the first observation category have been aligned with the first of the plurality of observations. The point cloud includes the plurality of points of each of the plurality of observations of the first observation category, the vehicle location trajectory of the first of the plurality of observations, and a plurality of shifted vehicle location trajectories. Each of the plurality of shifted vehicle location trajectories corresponds to one of the plurality of observations of the first observation category. Determining one of the plurality of aligned point clouds further may include determining the one of the plurality of aligned point clouds by aligning the point cloud based at least in part on the vehicle location trajectory of the each of the plurality of observations and the plurality of shifted vehicle location trajectories.

In another aspect of the present disclosure, aligning the second of the plurality of observations with the first of the plurality of observations further may include determining a plurality of point pairs. Each of the plurality of point pairs includes one point from the first of the plurality of observations and one point from the second of the plurality of observations. Aligning the second of the plurality of observations with the first of the plurality of observations further may include calculating a plurality of offset vectors. Each of the plurality of offset vectors corresponds to one of the plurality of point pairs. Each of the plurality of offset vectors describes an offset between the one of the plurality of point pairs. Aligning the second of the plurality of observations with the first of the plurality of observations further may include calculating a plurality of offset weights. Each of the plurality of offset weights corresponds to one of the plurality of point pairs. Each of the plurality of offset weights is calculated based at least in part on the plurality of point characteristics of each of the plurality of point pairs. Aligning the second of the plurality of observations with the first of the plurality of observations further may include combining the second of the plurality of observations with the first of the plurality of observations by shifting the second of the plurality of observations towards the first of the plurality of observations based at least in part on the plurality of offset vectors and the plurality of offset weights. The second of the plurality of observations is shifted towards the first of the plurality of observations using an iterative process. The plurality of offset vectors and the plurality of offset weights are re-calculated upon each iteration of the iterative process. The iterative process is concluded when a magnitude of each of the plurality of offset vectors is less than or equal to a predetermined offset magnitude threshold.

In another aspect of the present disclosure, calculating one of the plurality of offset weights further may include comparing each of the plurality of point characteristics of a first point of one the plurality of point pairs with each of the plurality of point characteristics of a second point of the one of the plurality of point pairs to identify a plurality of common point characteristics between the first point of one the plurality of point pairs and the second point of the one of the plurality of point pairs. Calculating one of the plurality of offset weights further may include calculating the one of the plurality of offset weights based at least in part on the plurality of common point characteristics.

In another aspect of the present disclosure, calculating the one of the plurality of offset weights based at least in part on the plurality of common point characteristics further may include determining a quantity of common point characteristics of the one of the plurality of point pairs based at least in part on the plurality of common point characteristics. Calculating the one of the plurality of offset weights based at least in part on the plurality of common point characteristics further may include calculating the one of the plurality of offset weights based at least in part on the quantity of common point characteristics. The one of the plurality of offset weights is proportional to the quantity of common point characteristics.

In another aspect of the present disclosure, determining the one of the plurality of aligned point clouds by aligning the point cloud further may include calculating an offset k which minimizes an objective function:

$$f(k) = \sum_i [d(p_i, p_i'(k))]^2$$

wherein f(k) is a quantity to be minimized, $d(p_i, p_i'(k))$ is a Euclidean distance between points $p_i$ and $p_i'(k)$, $p_i$ is an ith point on the vehicle location trajectory of one of the plurality of observations, and $p_i'(k)$ is an ith point on a corresponding one of the plurality of shifted vehicle location trajectories further shifted by the offset k. Determining the one of the plurality of aligned point clouds by aligning the point cloud further may include determining the one of the plurality of aligned point clouds by shifting the point cloud by the offset k.

According to several aspects, a system for crowd-sourcing lane line map data for a vehicle is provided. The system includes a server communication system. The system further includes a map database. The system further includes a server controller in electrical communication with the server communication system and the map database. The server controller is programmed to receive a plurality of observations from one or more vehicles using the server communication system. Each of the plurality of observations includes a vehicle location trajectory and a plurality of points positioned relative to the vehicle location trajectory. Each point of the plurality of points includes a plurality of point characteristics. One of the plurality of point characteristics is a location of each point relative to the vehicle location trajectory. Each of the plurality of points corresponds to an object in an environment surrounding the one or more vehicles. The server controller is programmed to classify the plurality of observations into a plurality of observation categories. Each of the plurality of observation categories includes at least one of the plurality of observations. The server controller is programmed to determine a plurality of aligned point clouds based at least in part on the plurality of observations. One of the plurality of aligned point clouds corresponds to each of the plurality of observation categories. The server controller is programmed to determine a plurality of lane line maps based at least in part on the plurality of aligned point clouds. One of the plurality of lane line maps corresponds to each of the plurality of aligned point clouds. The server controller is programmed to update the map database based at least in part on the plurality of lane line maps.

In another aspect of the present disclosure, to classify the plurality of observations, the server controller is further programmed to determine at least one observation characteristic of each of the plurality of observations based at least in part on the plurality of point characteristics of each of the plurality of points of each of the plurality of observations. To classify the plurality of observations, the server controller is further programmed to classify the plurality of observations based at least in part on the at least one observation characteristic. Each of the plurality of observation categories includes a subset of the plurality of observations having the at least one observation characteristic in common.

In another aspect of the present disclosure, to determine one of the plurality of aligned point clouds, the server controller is further programmed to identify a first of the plurality of observations. The first of the plurality of observations is in a first observation category of the plurality of observation categories. To determine one of the plurality of aligned point clouds, the server controller is further programmed to select a second of the plurality of observations. The second of the plurality of observations is in the first observation category. To determine one of the plurality of aligned point clouds, the server controller is further programmed to align the second of the plurality of observations with the first of the plurality of observations by shifting the vehicle location trajectory of the second of the plurality of observations to produce a shifted vehicle location trajectory. To determine one of the plurality of aligned point clouds, the server controller is further programmed to form a point cloud by repeating the selecting step and the aligning step until each of the plurality of observations of the first observation category have been aligned with the first of the plurality of observations. The point cloud includes the plurality of points of each of the plurality of observations of the first observation category, the vehicle location trajectory of the first of the plurality of observations, and a plurality of shifted vehicle location trajectories. Each of the plurality of shifted vehicle location trajectories corresponds to one of the plurality of observations of the first observation category. To determine one of the plurality of aligned point clouds, the server controller is further programmed to determine the one of the plurality of aligned point clouds by aligning the point cloud based at least in part on the vehicle location trajectory of the each of the plurality of observations and the plurality of shifted vehicle location trajectories.

In another aspect of the present disclosure, to align the second of the plurality of observations with the first of the plurality of observations, the server controller is further programmed to determine a plurality of point pairs. Each of the plurality of point pairs includes one point from the first of the plurality of observations and one point from the second of the plurality of observations. To align the second of the plurality of observations with the first of the plurality of observations, the server controller is further programmed to calculate a plurality of offset vectors. Each of the plurality of offset vectors corresponds to one of the plurality of point pairs. Each of the plurality of offset vectors describes an offset between the one of the plurality of point pairs. To align the second of the plurality of observations with the first of the plurality of observations, the server controller is further programmed to calculate a plurality of offset weights. Each of the plurality of offset weights corresponds to one of the plurality of point pairs. Each of the plurality of offset weights is calculated based at least in part on the plurality of point characteristics of each of the plurality of point pairs. To align the second of the plurality of observations with the first of the plurality of observations, the server controller is further programmed to combine the second of the plurality of observations with the first of the plurality of observations by shifting the second of the plurality of observations towards the first of the plurality of observations based at least in part on the plurality of offset vectors and the plurality of offset weights. The second of the plurality of observations is shifted towards the first of the plurality of observations using an iterative process. The plurality of offset vectors and the plurality of offset weights are re-calculated upon each iteration of the iterative process. The iterative process is concluded when a magnitude of each of the plurality of offset vectors is less than or equal to a predetermined offset magnitude threshold.

In another aspect of the present disclosure, to calculate one of the plurality of offset weights, the server controller is further programmed to compare each of the plurality of point characteristics of a first point of one the plurality of point pairs with each of the plurality of point characteristics of a second point of the one of the plurality of point pairs to identify a plurality of common point characteristics between the first point of one the plurality of point pairs and the second point of the one of the plurality of point pairs. To calculate one of the plurality of offset weights, the server controller is further programmed to calculate the one of the plurality of offset weights based at least in part on the plurality of common point characteristics.

In another aspect of the present disclosure, to calculate the one of the plurality of offset weights based at least in part on the plurality of common point characteristics, the server controller is further programmed to determine a quantity of common point characteristics of the one of the plurality of point pairs based at least in part on the plurality of common point characteristics. To calculate the one of the plurality of offset weights based at least in part on the plurality of common point characteristics, the server controller is further programmed to calculate the one of the plurality of offset weights based at least in part on the quantity of common point characteristics. The one of the plurality of offset weights is proportional to the quantity of common point characteristics.

In another aspect of the present disclosure, to update the map database, the server controller is further programmed to save the plurality of lane line maps in the map database. To update the map database, the server controller is further programmed to transmit the plurality of lane line maps using the server communication system. The plurality of lane line maps are received by the one or more vehicles. A behavior of an automated driving system of the one or more vehicles is adjusted based at least in part on the plurality of lane line maps.

According to several aspects, a system for crowd-sourcing lane line map data for a vehicle is provided. The system includes a vehicle system including a camera system, a global navigation satellite system (GNSS), a vehicle communication system, and a vehicle controller in electrical communication with the camera system, the GNSS, and the vehicle communication system. The vehicle controller is programmed to perform a plurality of observations of one or more lane lines on a roadway with the camera system and the GNSS. The plurality of observations includes a vehicle location trajectory determined by the GNSS and a plurality of points positioned relative to the vehicle location trajectory. Each point of the plurality of points includes a plurality of point characteristics. The plurality of points forms a point cloud which describes one or more lane lines. The vehicle controller is further programmed to transmit the plurality of observations to a server system. The vehicle controller is further programmed to receive a lane line map from the server system using the vehicle communication system. The vehicle controller is further programmed to adjust an operation of the vehicle based at least in part on the lane line map. The system also includes the server system including a server communication system and a server controller in electrical communication with the server communication system. The server controller is programmed to receive the plurality of observations using the server communication system. The server controller is further programmed to determine an aligned point cloud based at least in part on the plurality of observations. The server controller is further programmed to determine a lane line map based at least in part on the aligned point cloud. The server controller is further programmed to transmit the lane line map to the vehicle using the server communication system.

In another aspect of the present disclosure, to determine the aligned point cloud, the server controller is further programmed to identify a first of the plurality of observations. To determine the aligned point cloud, the server controller is further programmed to select a second of the plurality of observations. To determine the aligned point cloud, the server controller is further programmed to align the second of the plurality of observations with the first of the plurality of observations by shifting the vehicle location trajectory of the second of the plurality of observations to produce a shifted vehicle location trajectory. To determine the aligned point cloud, the server controller is further programmed to form a point cloud by repeating the selecting step and the aligning step until each of the plurality of observations have been aligned with the first of the plurality of observations. The point cloud includes the plurality of points of each of the plurality of observations, the vehicle location trajectory of the first of the plurality of observations, and a plurality of shifted vehicle location trajectories. Each of the plurality of shifted vehicle location trajectories corresponds to one of the plurality of observations. To determine the aligned point cloud, the server controller is further programmed to determine the aligned point cloud by aligning the point cloud based at least in part on the vehicle location trajectory of the each of the plurality of observations and the plurality of shifted vehicle location trajectories.

In another aspect of the present disclosure, to align the second of the plurality of observations with the first of the plurality of observations, the server controller is further programmed to determine a plurality of point pairs. Each of the plurality of point pairs includes one point from the first of the plurality of observations and one point from the second of the plurality of observations. To align the second of the plurality of observations with the first of the plurality of observations, the server controller is further programmed to calculate a plurality of offset vectors. Each of the plurality of offset vectors corresponds to one of the plurality of point pairs. Each of the plurality of offset vectors describes an offset between the one of the plurality of point pairs. To align the second of the plurality of observations with the first of the plurality of observations, the server controller is further programmed to calculate a plurality of offset weights. Each of the plurality of offset weights corresponds to one of the plurality of point pairs. Each of the plurality of offset weights is calculated based at least in part on the plurality of point characteristics of each of the plurality of point pairs. To align the second of the plurality of observations with the first of the plurality of observations, the server controller is further programmed to combine the second of the plurality of observations with the first of the plurality of observations by shifting the second of the plurality of observations towards the first of the plurality of observations based at least in part on the plurality of offset vectors and the plurality of offset weights. The second of the plurality of observations is shifted towards the first of the plurality of observations using an iterative process. The plurality of offset vectors and the plurality of offset weights are re-calculated upon each iteration of the iterative process. The iterative process is concluded when a magnitude of each of the plurality of offset vectors is less than or equal to a predetermined offset magnitude threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Road markings, such as, for example, lane lines, are an important element of road infrastructure, traditionally used to communicate vital information, such as, for example, road edge location, to drivers. Vehicles may use perception sensor systems such as, for example, camera systems to acquire information about lane lines. Information about lane lines acquired by vehicle perception sensor systems may be used to provide features such as automated driving systems (ADS), advanced driver assistance systems (ADAS), and/or the like. The present disclosure provides a new and improved method for acquiring and aggregating lane line data from multiple vehicles to generate lane line maps.

Figure 1:
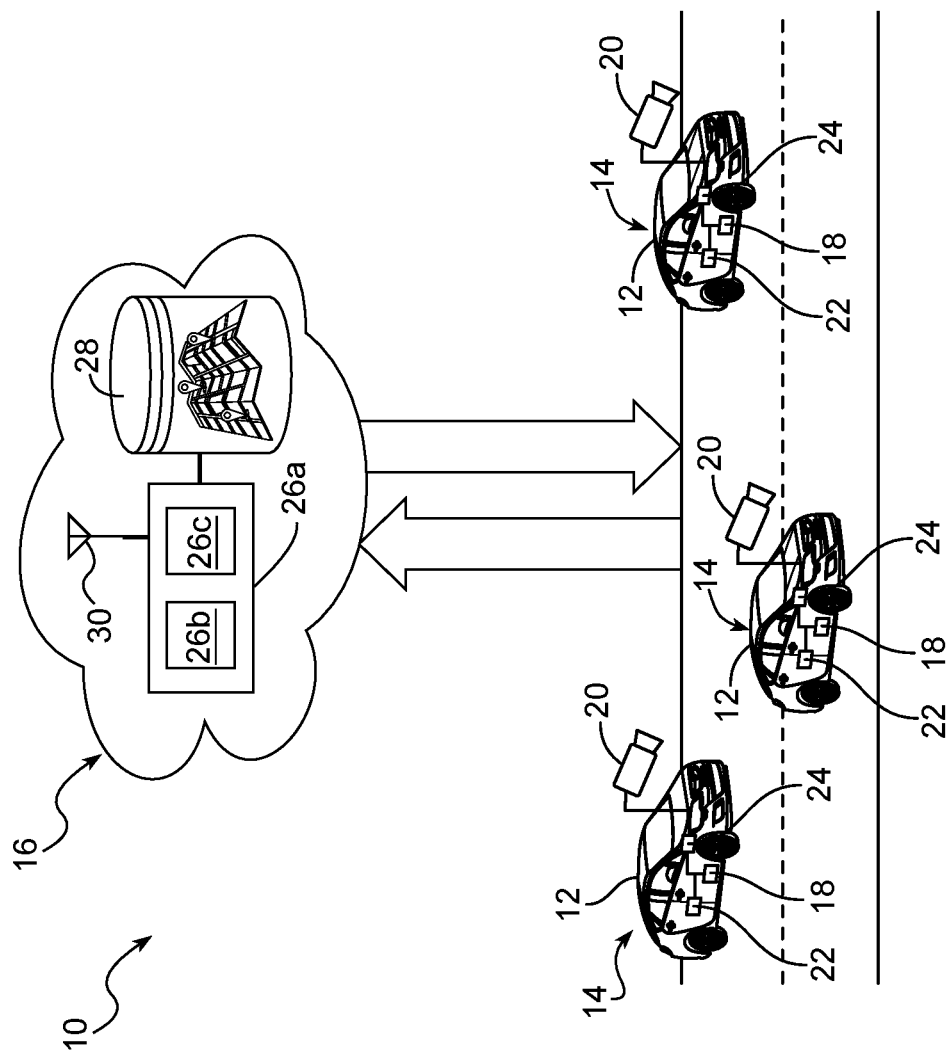
FIG. 1 is a schematic diagram of a system for crowd-sourcing lane line map data, according to an exemplary embodiment.

Referring to FIG. 1, a schematic diagram of a system 10 for crowd-sourcing lane line map data is shown. The system 10 includes one or more vehicles 12, each of the one or more vehicles 12 including a vehicle system 14. The system 10 further includes a server system 16.

The vehicle system 14 includes a vehicle controller 18, a camera system 20, a global navigation satellite system (GNSS) 22, and a vehicle communication system 24.

The vehicle controller 18 is used to implement a method 100 for crowd-sourcing lane line map data, as will be described below. The vehicle controller 18 includes at least one processor and a non-transitory computer readable storage device or media. The processor may be a custom made or commercially available processor, a central processing unit (CPU), a graphics processing unit (GPU), an auxiliary processor among several processors associated with the vehicle controller 18, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 18 to control various systems of the vehicle 12. The vehicle controller 18 may also consist of multiple controllers which are in electrical communication with each other. The vehicle controller 18 may be interconnected with additional systems and/or controllers of the vehicle 12, allowing the vehicle controller 18 to access data such as, for example, speed, acceleration, braking, and steering angle of the vehicle 12.

The vehicle controller 18 is in electrical communication with the camera system 20, GNSS 22, and the vehicle communication system 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 18 are within the scope of the present disclosure.

The camera system 20 is used to capture images and/or videos of the environment surrounding the vehicle 12. In an exemplary embodiment, the camera system 20 includes a photo and/or video camera which is positioned to view the environment surrounding the vehicle 12. In a non-limiting example, the camera system 20 includes cameras affixed inside of the vehicle 12, for example, in a headliner of the vehicle 12, having a view through the windscreen. In another non-limiting example, the camera system 20 includes cameras affixed outside of the vehicle 12, for example, on a roof of the vehicle 12, having a view of the environment in front of the vehicle 12.

In another exemplary embodiment, the camera system 20 is a surround view camera system including a plurality of cameras (also known as satellite cameras) arranged to provide a view of the environment adjacent to all sides of the vehicle 12. In a non-limiting example, the camera system 20 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 20 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 22 is used to determine a geographical location of the vehicle 12. In an exemplary embodiment, the GNSS 22 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 22 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 22. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 22 may be integrated with the vehicle controller 18 (e.g., on a same circuit board with the vehicle controller 18 or otherwise a part of the vehicle controller 18) without departing from the scope of the present disclosure.

The vehicle communication system 24 is used by the vehicle controller 18 to communicate with other systems external to the vehicle 12. For example, the vehicle communication system 24 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 24 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 24 may further include an embedded universal integrated circuit card (eUICC) configured to store at least one cellular connectivity configuration profile, for example, an embedded subscriber identity module (eSIM) profile. The vehicle communication system 24 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 24 may include one or more antennas and/or communication transceivers for receiving and/or transmitting signals, such as cooperative sensing messages (CSMs). The vehicle communication system 24 is configured to wirelessly communicate information between the vehicle 12 and another vehicle. Further, the vehicle communication system 24 is configured to wirelessly communicate information between the vehicle 12 and infrastructure or other vehicles. It should be understood that the vehicle communication system 24 may be integrated with the vehicle controller 18 (e.g., on a same circuit board with the vehicle controller 18 or otherwise a part of the vehicle controller 18) without departing from the scope of the present disclosure.

With continued reference to FIG. 1, the server system 16 includes a server controller 26a in electrical communication with a map database 28 and a server communication system 30. In a non-limiting example, the server system 16 is located in a server farm, datacenter, or the like, and connected to the internet using the server communication system 30. The server controller 26a includes at least one server processor 26b and a server non-transitory computer readable storage device or server media 26c. The description of the type and configuration given above for the vehicle controller 18 also applies to the server controller 26a. In some examples, the server controller 26*a* may differ from the vehicle controller 18 in that the server controller 26*a* is capable of a higher processing speed, includes more memory, includes more inputs/outputs, and/or the like. In a non-limiting example, the server processor 26*b* and server media 26*c* of the server controller 26*a* are similar in structure and/or function to the processor and the media of the vehicle controller 18, as described above. The map database 28 is used to store map data about roadways, including, for example, lane line map data, as will be discussed in greater detail below. The server communication system 30 is used to communicate with external systems, such as, for example, the vehicle controller 18 via the vehicle communication system 24. In a non-limiting example, server communication system 30 is similar in structure and/or function to the vehicle communication system 24 of the vehicle system 14, as described above. In some examples, the server communication system 30 may differ from the vehicle communication system 24 in that the server communication system 30 is capable of higher power signal transmission, more sensitive signal reception, higher bandwidth transmission, additional transmission/reception protocols, and/or the like.

Figure 2:
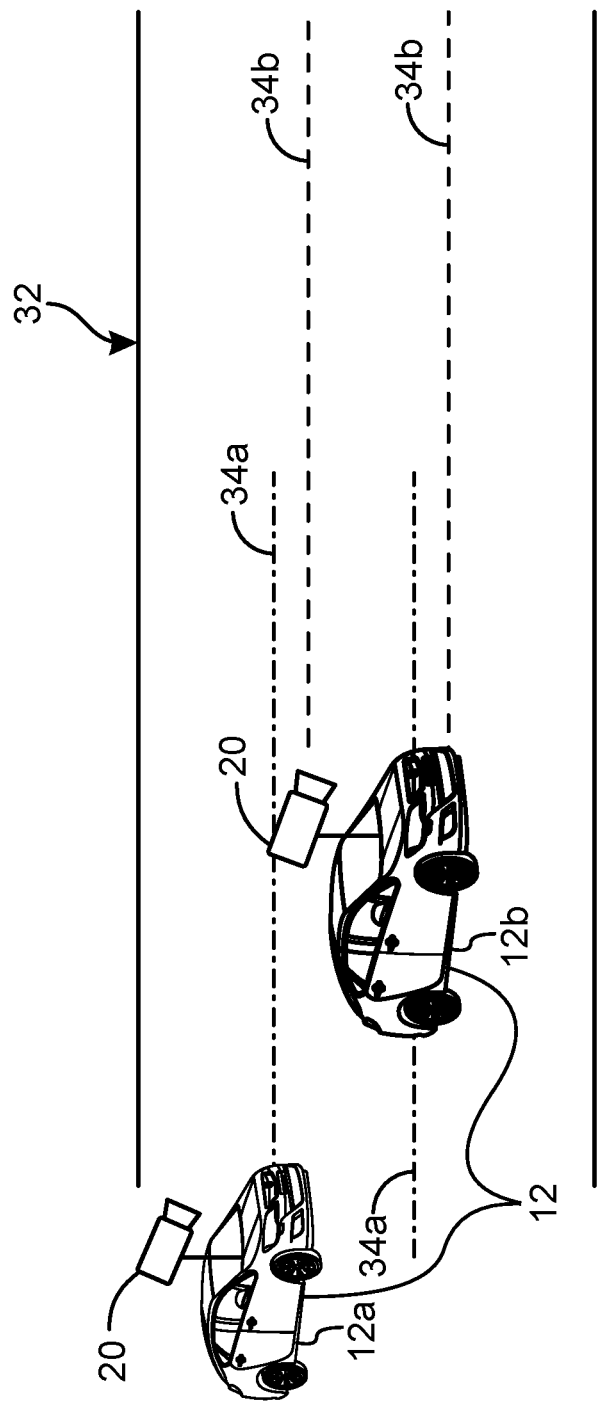
FIG. 2 is a schematic diagram of multiple vehicles travelling on a roadway showing misalignment between lane lines, according to an exemplary embodiment.

Referring to FIG. 2, a schematic diagram of multiple vehicles travelling on a roadway showing misalignment between lane lines is shown. When traveling on a roadway 32, a first vehicle 12*a* uses the camera system 20 to determine a first lane line location 34*a* of lane lines on the roadway 32. In the scope of the present disclosure, lane lines are lines on the roadway 32 which are configured to indicate edges of the roadway 32 and/or edges of lanes of the roadway 32. Lane lines may have multiple characteristics, including color (e.g., yellow or white), type (e.g., solid or dashed), and/or the like. A second vehicle 12*b* uses the camera system 20 to determine a second lane line location 34*b* of lane lines on the roadway 32. As illustrated in FIG. 2, even though the first vehicle 12*a* and the second vehicle 12*b* are traveling on the same roadway 32, the first lane line location 34*a* and the second lane line location 34*b* may be misaligned. Misalignment may occur due to factors such as, for example, GPS/GNSS error, poor lane line marking condition, inclement weather conditions, and/or the like. Therefore, the system 10 and method 100 of the present disclosure allow for alignment of lane line locations determined by multiple vehicles.

Figure 3:
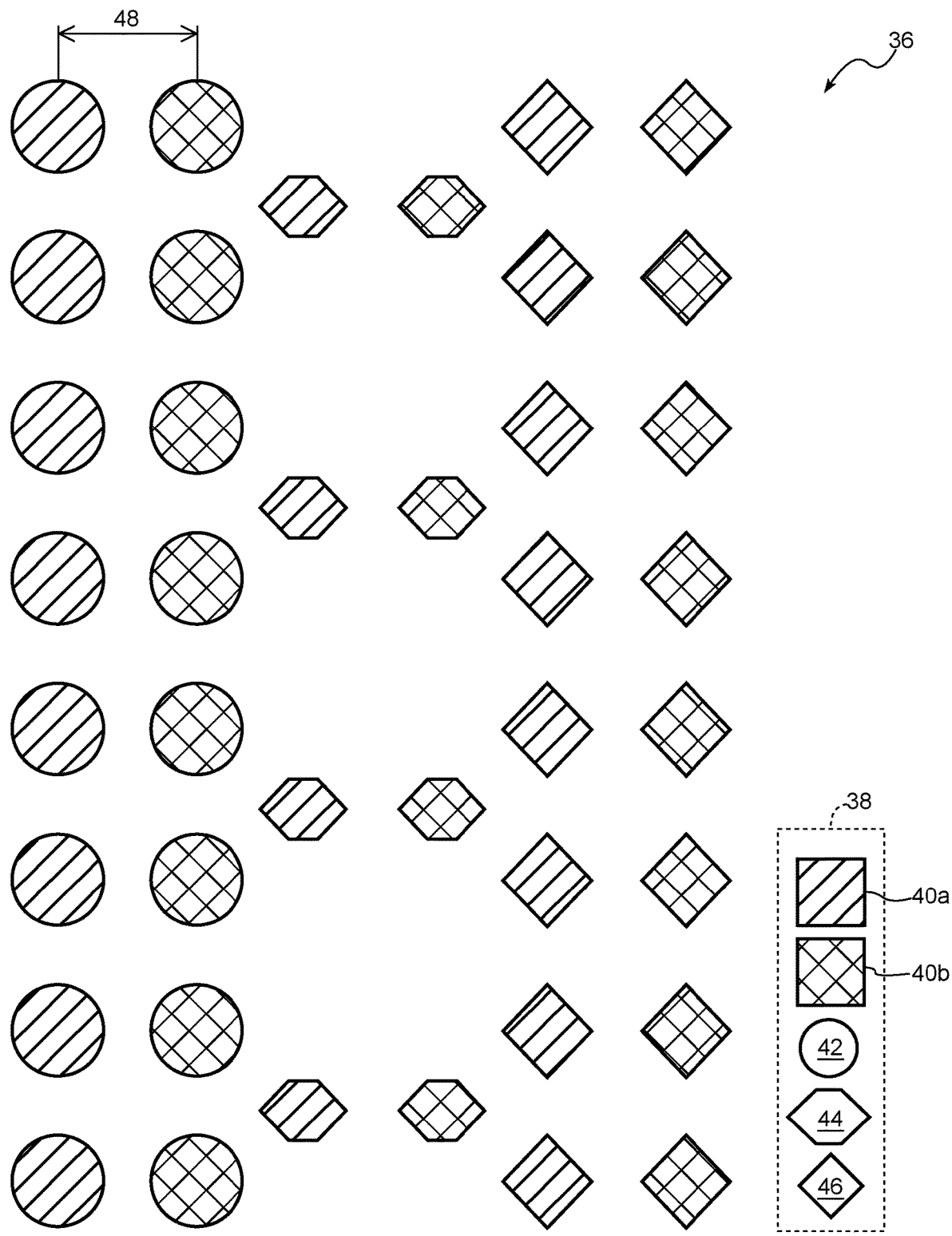
FIG. 3 is a diagram of a plurality of observations, according to an exemplary embodiment.

Referring to FIG. 3, a diagram of a plurality of observations 36 is shown. The plurality of observations 36 are observations of lane lines on the roadway 32 produced by the one or more vehicles 12, as will be discussed in greater detail below. FIG. 3 includes a key 38 which indicates the meaning of various shapes and hatch fills in FIG. 3. Shapes having a diagonal hatch fill represent a first observation 40*a* of the plurality of observations 36. Shapes having a cross hatch fill represent a second observation 40*b* of the plurality of observations 36. Circles represent points defining a left lane line 42, hexagons represent points defining a vehicle location trajectory 44, and diamonds represent points defining a right lane line 46. As shown in FIG. 3, each of the plurality of observations 36 includes a plurality of points 42, 46 and a vehicle location trajectory 44. Each of the plurality of points 42, 46 corresponds to an object in the environment surrounding the one or more vehicles 12, for example, a portion of a lane line on the roadway 32. In the scope of the present disclosure, the vehicle location trajectory 44 represents locations of the one or more vehicles 12 at various points in time while recording the plurality of observations 36. Each of the plurality of points 42, 46 includes a plurality of point characteristics. In an exemplary embodiment, the plurality of point characteristics includes information about the lane line at the location of a given point. In a non-limiting example, the plurality of point characteristics includes a lane line color (e.g., yellow or white), a lane line type (e.g., solid, dashed, single, or double), a lane line location relative to traffic direction (e.g., left relative to southbound vehicles), a location of the point relative to the vehicle location trajectory 44, and/or the like. As discussed above in reference to FIG. 2, misalignment between detected lane lines may be present, as is also visible in FIG. 3. A misalignment between any two corresponding points (i.e., a point pair) between the first observation 40*a* and the second observation 40*b* is represented as an offset vector 48. The offset vector 48 includes an offset magnitude and an offset direction. While the example in FIG. 3 shows an offset in one direction (i.e., a horizontal direction), it should be understood that the offset may also occur in one or more directions (e.g., a vertical and a horizontal direction) without departing from the scope of the present disclosure.

Figure 4:
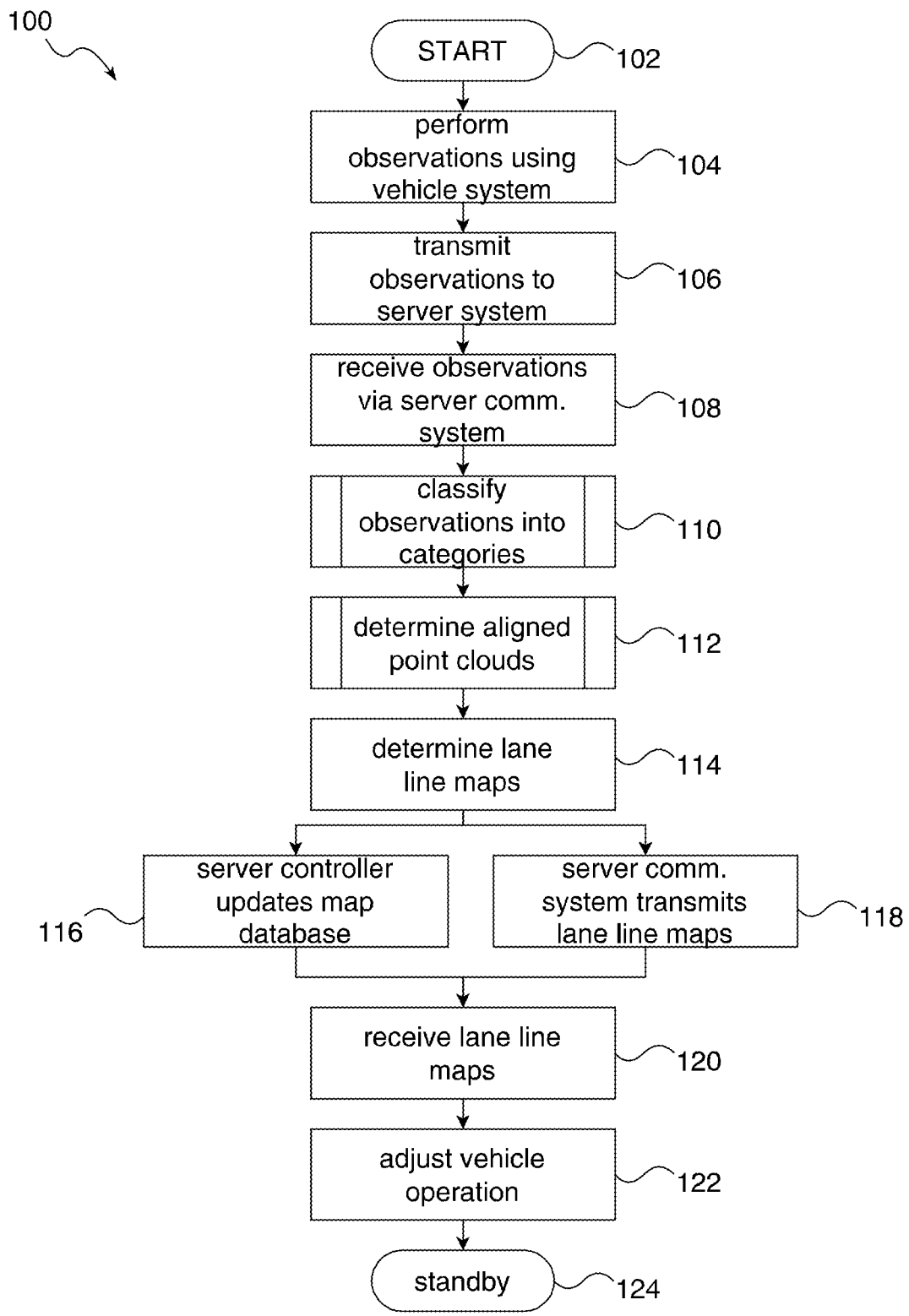
FIG. 4 is a flowchart of a method for crowd-sourcing lane line map data for a vehicle, according to an exemplary embodiment.

Referring to FIG. 4, a flowchart of the method 100 for crowd-sourcing lane line map data for a vehicle is shown. The method 100 begins at block 102 and proceeds to block 104. With reference to FIG. 4 and continued reference to FIG. 3, at block 104, the one or more vehicles 12 perform the plurality of observations 36 using the vehicle system 14. In an exemplary embodiment, the each of the plurality of observations 36 includes one or more lane lines (e.g., the left lane line 42 and/or the right lane line 46) and the vehicle location trajectory 44 on the roadway 32. In a non-limiting example, the one or more lane lines are captured using the camera system 20. For example, the vehicle controller 18 uses the camera system 20 to capture a plurality of images of the roadway 32. The vehicle controller 18 then uses a computer vision algorithm to identify the one or more lane lines in the plurality of images of the roadway 32. The one or more lane lines are then segmented into a plurality of points (e.g., the plurality of points 42, 46), such that each of the plurality of points corresponds to a portion of the one or more lane lines. The plurality of point characteristics is determined for each of the plurality of points, using, for example, the computer vision algorithm. In a non-limiting example, the vehicle location trajectory 44 is determined using the GNSS 22 of the vehicle system 14. The vehicle location trajectory 44 represents a location track of the vehicle 12 during each of the plurality of observations 36. It should be understood that the plurality of observations 36 may be performed by one or more vehicles 12. The plurality of observations 36 may include multiple observations of the same geographical location and/or multiple observations of different geographical locations without departing from the scope of the present disclosure. After block 104, the method 100 proceeds to block 106.

At block 106, the plurality of observations performed at block 104 are transmitted from the one or more vehicles 12 to the server system 16. In an exemplary embodiment, each of the one or more vehicles 12 uses the vehicle communication system 24 of the vehicle system 14 to transmit one or more observations to the server communication system 30 of the server system 16. After block 106, the method 100 proceeds to block 108.

At block 108, the server system 16 receives the plurality of observations transmitted at block 106 using the server communication system 30. After block 108, the method 100 proceeds to block 110.

At block 110, the server system 16 classifies the plurality of observations received at block 108. In an exemplary embodiment, the server controller 26*a* classifies the plurality of observations into a plurality of observation categories, as will be discussed in greater detail below. After block 110, the method 100 proceeds to block 112.

At block 112, the server system 16 determines a plurality of aligned point clouds based at least in part on the plurality of observations received at block 108. Each of the plurality of aligned point clouds corresponds to one of the plurality of observation categories, as will be discussed in greater detail below. After block 112, the method 100 proceeds to block 114.

At block 114, the server system 16 determines a plurality of lane line maps based at least in part on the plurality of aligned point clouds determined at block 112. In the scope of the present disclosure, a lane line map is data defining one or more lane lines at a particular geographic location on a roadway. In a non-limiting example, the lane line map includes mathematical and/or geometrical equations which define a continuous line representing a shape, size, arrangement, location, and/or the like of the one or more lane lines. The lane line map also includes characteristics of the one or more lane lines, such as, for example, color, type, and/or the like. It should be understood that the lane line map may include additional elements, such as, for example, additional painted markings, road edges (i.e., boundaries between paved surfaces and unpaved surfaces), virtual lane lines (i.e., computer-inferred lane lines where painted lane lines are not present, for example, within an intersection), and/or additional objects, markings, and characteristics of roadways without departing from the scope of the present disclosure. Additionally, it should be understood that the system 10 and method 100 disclosed herein are applicable to the additional elements of lane line maps disclosed above in addition to the one or more lane lines. In an exemplary embodiment, to determine a lane line map, the server controller 26a uses a hill climbing algorithm, as discussed in U.S. application Ser. No. 17/930,503, titled "HILL CLIMBING ALGORITHM FOR CONSTRUCTING A LANE LINE MAP", filed on Sep. 8, 2022, the entire contents of which is hereby incorporated by reference. It should be understood that any method for determining a mathematical equation describing one or more lane lines based on a point cloud is within the scope of the present disclosure. After block 114, the method 100 proceeds to blocks 116 and 118.

At block 116, the server controller 26a updates the map database 28. In an exemplary embodiment, the server controller 26a saves the plurality of lane line maps determined at block 114 to the map database 28. After block 116, the method 100 proceeds to block 120, as will be discussed in greater detail below.

At block 118, the server controller 26a uses the server communication system 30 to transmit the plurality of lane line maps determined at block 114 to the one or more vehicles 12. After block 118, the method 100 proceeds to block 120.

At block 120, the one or more vehicles 12 receive the plurality of lane line maps transmitted at block 118. After block 120, the method 100 proceeds to block 122.

At block 122, the one or more vehicles 12 takes action based at least in part on the plurality of lane line maps received at block 120. In an exemplary embodiment, the action includes adjusting an operation of the vehicle 12. In a non-limiting example, adjusting the operation of the vehicle 12 includes adjusting the operation of an automated driving system of the vehicle 12. For example, a pathfinding module of the automated driving system may utilize the plurality of lane line maps to adjust a path of the vehicle 12. In another non-limiting example, adjusting the operation of the vehicle 12 includes adjusting an operation of an advanced driver assistance system (ADAS), such as, for example, lane keeping system and/or a lane departure warning system. In another non-limiting example, adjusting the operation of the vehicle 12 includes providing a notification and/or visual display of the one or more lanes to an occupant of the vehicle 12 using a display, such as, for example, a head-up display (HUD). After block 122, the method 100 proceeds to enter a standby state at block 124.

Figure 5:
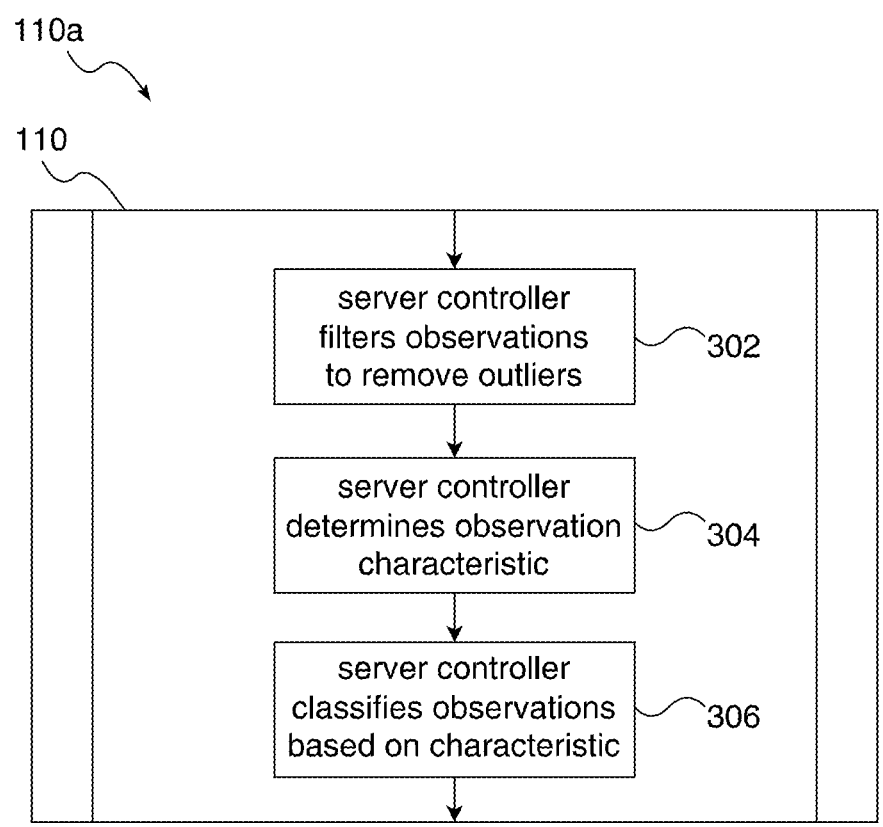
FIG. 5 is a flowchart of a method for classifying the plurality of observations, according to an exemplary embodiment.

Referring to FIG. 5, a flowchart of an exemplary embodiment 110a of block 110 is shown. The exemplary embodiment 110a begins at block 302. At block 302, the server controller 26a filters the plurality of observations to remove outlier observations. In a non-limiting example, if the plurality of observations includes multiple corroborating lane lines within a predetermined threshold distance (e.g., ten meters) from one another and a second lane line which is located thirty meters from the multiple corroborating lane lines, the second lane line is considered to be an outlier and is removed from the plurality of observations at block 302. After block 302, the exemplary embodiment 110a proceeds to block 304.

At block 304, the server controller 26a determines at least one observation characteristic of each of the plurality of observations 36. In the scope of the present disclosure, the at least one observation characteristic includes, for example, an average vehicle heading of each of the plurality of observations 36, a percentage of points of each of the plurality of observations 36 having a particular line type (e.g., solid line, dashed line, double line, and/or the like), and/or the like. In an exemplary embodiment, the at least one observation characteristic is determined based at least in part on the plurality of point characteristics of each of the plurality of points 42, 46 of each of the plurality of observations 36. It should be understood that the at least one observation characteristic may include any characteristic and/or statistic of each of the plurality of observations 36. After block 304, the exemplary embodiment 110a proceeds to block 306.

At block 306, the server controller 26a classifies the plurality of observations 36 based at least in part on the at least one observation characteristic of each of the plurality of observations 36 determined at block 304. In an exemplary embodiment, each of the plurality of observation categories includes a subset of the plurality of observations 36 having the at least one observation characteristic in common. In a non-limiting example wherein the at least one observation characteristic includes the average vehicle heading, observations having an average vehicle heading within a predetermined heading tolerance range (e.g., plus or minus ten degrees) are grouped in the same observation category. In a non-limiting example wherein the at least one observation characteristic includes a percentage of left lane lines (relative to the observing vehicle) having a dashed type, observations having a percentage of left dashed lane lines within a predetermined lane type percentage range (e.g., plus or minus ten percent) are grouped in the same observation category. It should be understood that any data clustering algorithm, such as, for example, a density-based spatial clustering of applications with noise (DBSCAN) algorithm, a connectivity-based clustering algorithm, a centroid-based clustering algorithm, and/or the like without departing from the scope of the present disclosure. After block 306, the exemplary embodiment 110a is concluded, and the method 100 proceeds as discussed above.

Figure 6:
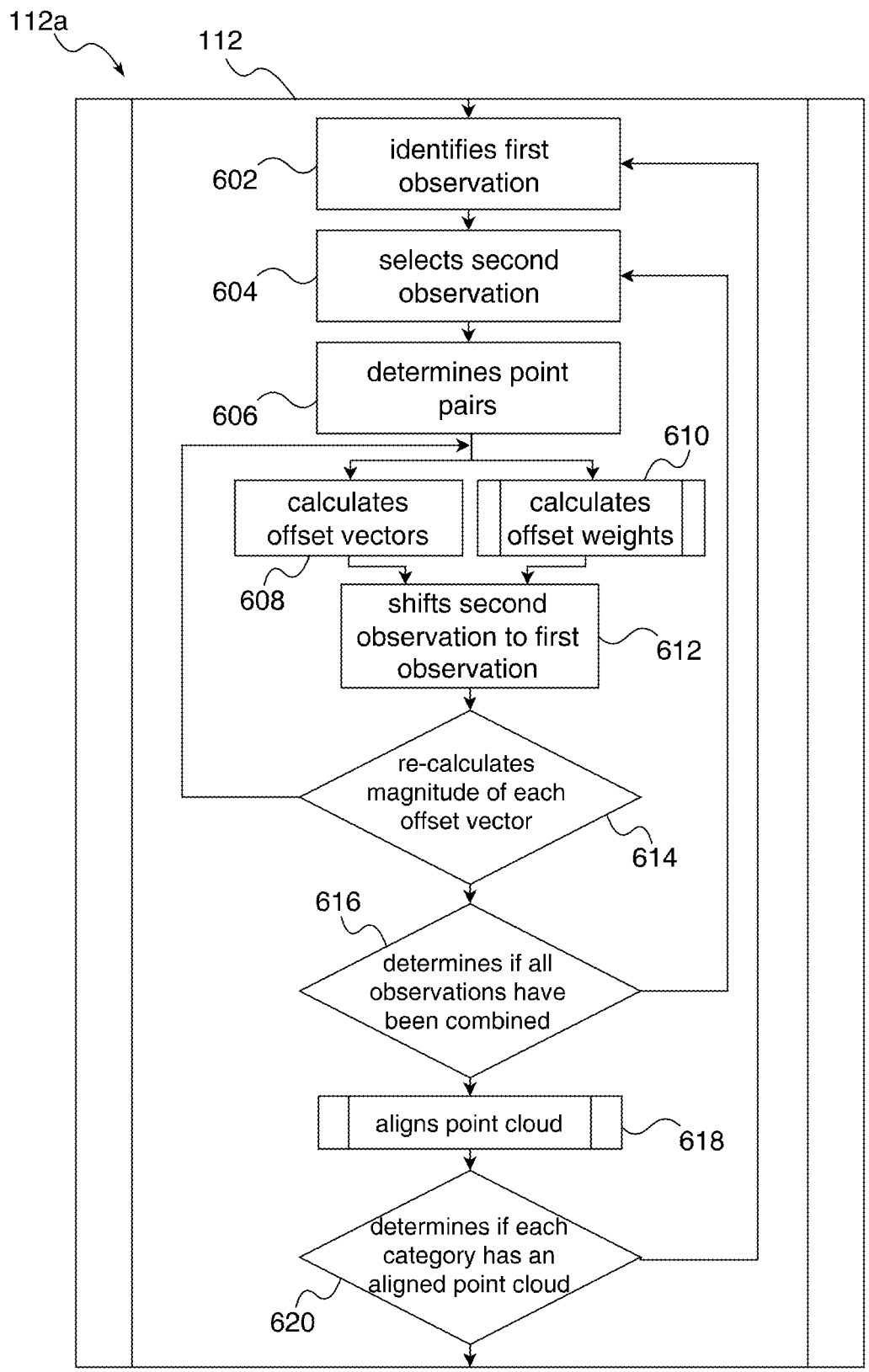
FIG. 6 is a flowchart of a method for determining a plurality of aligned point clouds based at least in part on the plurality of observations, according to an exemplary embodiment.

Referring to FIG. 6, a flowchart of an exemplary embodiment 112a of block 112 is shown. The exemplary embodiment 112a begins at block 602. At block 602, the server controller 26a identifies the first observation 40a of the plurality of observations 36. In an exemplary embodiment, the first observation 40a is in a first observation category of the plurality of observation categories. In a first exemplary embodiment, the first observation 40a is chosen randomly from the plurality of observations 36. In a second exemplary embodiment, the first observation 40a is chosen to be a "good quality" observation of the plurality of observations 36. In a non-limiting example, a good quality observation is defined as an observation including long, substantially continuous lane lines, indicating good data collection quality. After block 602, the exemplary embodiment 112a proceeds to block 604.

At block 604, the server controller 26a selects a second of the plurality of observations 36. The second of the plurality of observations 36 is also in the first observation category (i.e., the same observation category as the first of the plurality of observations 36 identified at block 602). After block 604, the exemplary embodiment 112a proceeds to block 606.

At block 606, the server controller 26a determines a plurality of point pairs. In the scope of the present disclosure, each of the plurality of point pairs includes one point from the first of the plurality of observations 36 identified at block 602 and one point from the second of the plurality of observations 36 selected at block 604. In an exemplary embodiment, the point pairs are determined based at least in part on the plurality of point characteristics of each of the plurality of points 42, 46. In a non-limiting example, the point pairs are determined based on a location of each of the plurality of points. For example, for a given point pair, a first point of the given point pair is a point from the first of the plurality of observations 36. A second point of the given point pair is a point a point from the second of the plurality of observations 36 which is closest to the first point of the given point pair compared to all other points of the second of the plurality of observations 36. After block 606, the exemplary embodiment 112a proceeds to blocks 608 and 610.

At block 608, the server controller 26a calculates a plurality of offset vectors. In the scope of the present disclosure, an offset vectors includes an offset magnitude and an offset direction, and describes an offset (i.e., misalignment) between the first point and the second point of a given one of the plurality of point pairs determined at block 606. Each of the plurality of offset vectors corresponds to one of the plurality of point pairs. In an exemplary embodiment, the plurality of offset vectors are calculated based a location of the first point relative to the second point of each of the plurality of point pairs, as determined, for example, based on the plurality of point characteristics of each of the points. After block 608, the exemplary embodiment 112a proceeds to block 612, as will be discussed in greater detail below.

At block 610, the server controller 26a calculates a plurality of offset weights. Each of the plurality of offset weights corresponds to one of the plurality of point pairs, as will be discussed in greater detail below. After block 610, the exemplary embodiment 112a proceeds to block 612.

At block 612, the server controller 26a shifts the second of the plurality of observations 36 towards the first of the plurality of observations. In an exemplary embodiment, a magnitude and direction of the shift is determined based at least in part on the plurality of offset vectors calculated at block 608 and the plurality of offset weights calculated at block 610. In a non-limiting example, the second of the plurality of observations 36 is shifted such the magnitude of the offset vector of one of the plurality of point pairs having a highest offset weight is reduced. In other words, the second of the plurality of observations is shifted in the direction of the offset vector of one of the plurality of point pairs having a highest offset weight. After block 612, the exemplary embodiment 112a proceeds to block 614.

At block 614, the server controller 26a re-calculates the magnitude of each of the plurality of offset vectors based on the new position of the second of the plurality of observations 36 after shifting at block 612. If the magnitude of each of the plurality of offset vectors is greater than a predetermined offset magnitude threshold (e.g., one meter), the exemplary embodiment 112a returns to blocks 608 and 610. If the magnitude of each of the plurality of offset vectors is less than or equal to the predetermined offset magnitude threshold, the second of the plurality of observations 36 is considered to have been combined with the first of the plurality of observations, and the exemplary embodiment 112a proceeds to block 616.

At block 616, the server controller 26a determines whether each of the plurality of observations 36 in the first observation category (i.e., the same observation category as the first of the plurality of observations 36 identified at block 602) has been combined with the first of the plurality of observations 36. If each of the plurality of observations 36 in the first observation category has not been combined with the first of the plurality of observations 36, the exemplary embodiment 112a returns to block 604. If each of the plurality of observations 36 in the first observation category has been combined with the first of the plurality of observations 36, a point cloud has been formed. The point cloud includes the plurality of points 42, 46 of each of the plurality of observations 36 of the first observation category, the vehicle location trajectory 44 of the first of the plurality of observations 36, and a plurality of shifted vehicle location trajectories (not shown), wherein each of the plurality of shifted vehicle location trajectories corresponds to one of the plurality of observations 36 of the first observation category (e.g., the second of the plurality of observations). After formation of the point cloud, the exemplary embodiment 112a proceeds to block 618.

At block 618, the server controller 26a determines one of the plurality of aligned point clouds by aligning the point cloud formed at block 616 based at least in part on the vehicle location trajectory of the each of the plurality of observations 36 and the plurality of shifted vehicle location trajectories, as will be discussed in greater detail below. After block 618, the exemplary embodiment 112a proceeds to block 620.

At block 620, the server controller 26a determines whether an aligned point cloud has been determined for each of the plurality of observation categories. If an aligned point cloud has not been determined for each of the plurality of observation categories, the exemplary embodiment 112a returns to block 602. If an aligned point cloud has been determined for each of the plurality of observation categories, the exemplary embodiment 112a is concluded, and the method 100 proceeds as described above.

Figure 7:
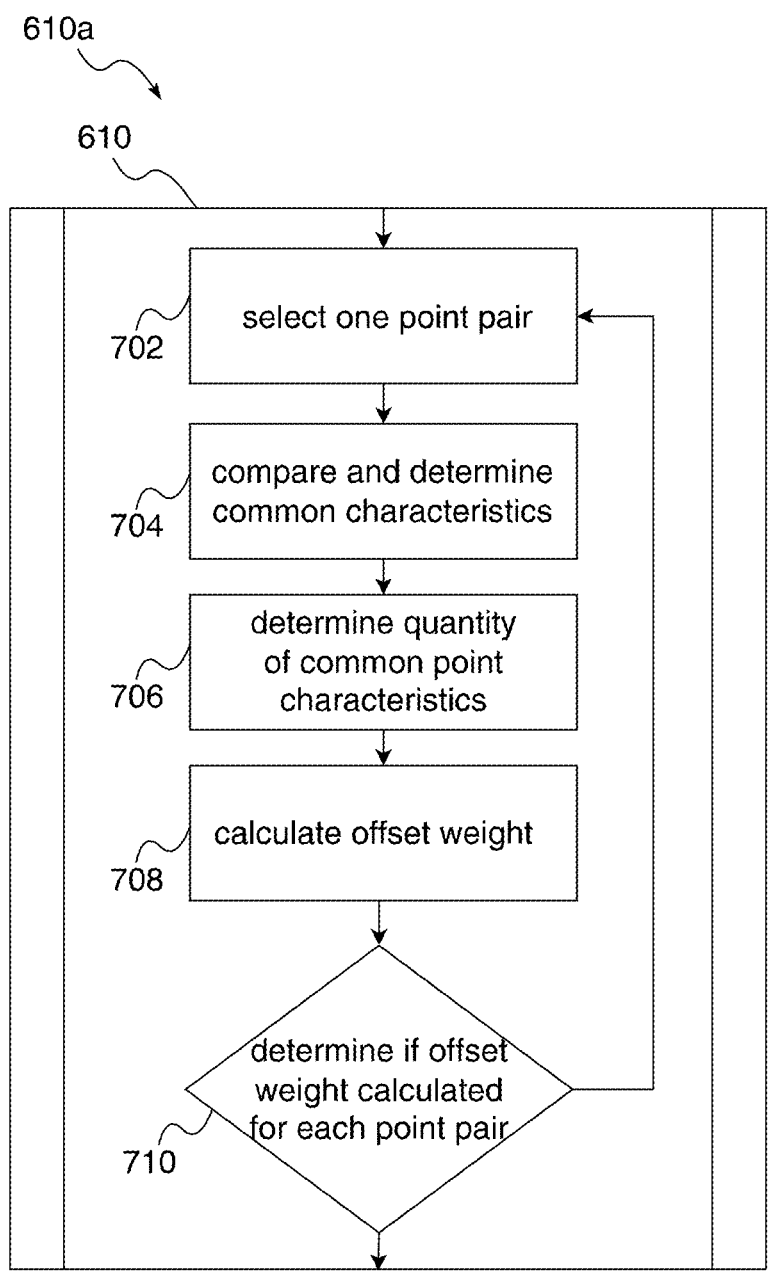
FIG. 7 is a flowchart of a method for calculating a plurality of offset weights, according to an exemplary embodiment.

Referring to FIG. 7, a flowchart of an exemplary embodiment 610a of block 610 is shown. The exemplary embodiment 610a begins at block 702. At block 702, the server controller 26a selects one of the plurality of point pairs determined at block 606. After block 702, the exemplary embodiment 610a proceeds to block 704.

At block 704, the server controller 26a compares each of the plurality of point characteristics of a first point of the selected one of the plurality of point pairs to each of the plurality of point characteristics of a second point of the selected one of the plurality of point pairs to identify a plurality of common point characteristics. In the scope of the present disclosure, common point characteristics are point characteristics which are the same. For example, if the first point of the selected one of the plurality of point pairs and the second point of the selected one of the plurality of point pairs both have a point characteristic indicating a line type of a double yellow line, the double yellow line point characteristics considered to be one of the plurality of common point characteristics. After block 704, the exemplary embodiment 610*a* proceeds to block 706.

At block 706, the server controller 26*a* determines a quantity of the plurality of common point characteristics determined at block 704. After block 706, the exemplary embodiment 610*a* proceeds to block 708.

At block 708, the server controller 26*a* calculates one of the plurality of offset weights based at least in part on the quantity of the plurality of common point characteristics determined at block 706. In an exemplary embodiment, the one of the plurality of offset weights is directly proportional to the quantity of common point characteristics. It should be understood that any mathematical relationship between the quantity of the plurality of common point characteristics and the one of the plurality of offset weights is within the scope of the present disclosure. After block 708, the exemplary embodiment 610*a* proceeds to block 710.

At block 710, if one of the plurality of offset weights has not been calculated for each of the plurality of point pairs, the exemplary embodiment 610*a* returns to block 702. If one of the plurality of offset weights has been calculated for each of the plurality of point pairs, the exemplary embodiment 610*a* is concluded, and the exemplary embodiment 112*a* proceeds as discussed above.

Figure 8:
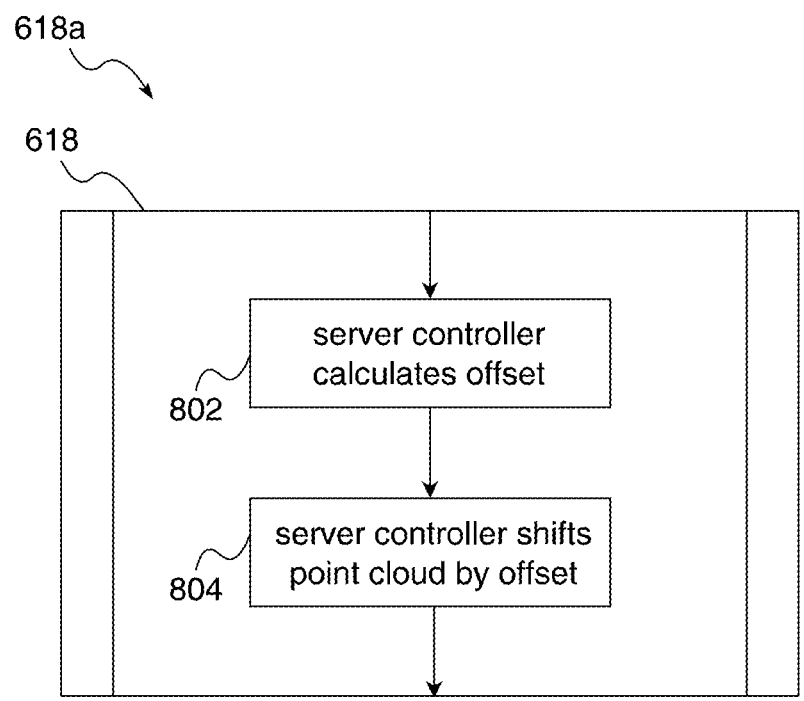
FIG. 8 is a flowchart of a method for determining one of the plurality of aligned point clouds, according to an exemplary embodiment.

Referring to FIG. 8, a flowchart of an exemplary embodiment 618*a* of block 618 is shown. The exemplary embodiment 618*a* accounts for drift in geographical location of the point cloud induced by the method for forming the point cloud discussed above in reference to the exemplary embodiment 112*a*. The exemplary embodiment 618*a* begins at block 802. At block 802, the server controller 26*a* calculates an offset. In the scope of the present disclosure, the offset is a distance (e.g., two meters) by which the point cloud formed at block 616 must be shifted to correct for location error, such that the geographical location of the point cloud is accurate relative to the roadway 32. In an exemplary embodiment, the offset is a value which minimizes the following objective function:

$$f(k) = \sum_i [d(p_i, p_i'(k))]^2 \quad (1)$$

wherein f(k) is a quantity to be minimized, $d(p_i, p_i'(k))$ is a Euclidean distance between points $p_i$ and $p_i'(k)$, $p_i$ is an ith point on the vehicle location trajectory of one of the plurality of observations 36, and $p_i'(k)$ is an ith point on a corresponding one of the plurality of shifted vehicle location trajectories further shifted by the offset k. In a non-limiting example, equation (1) is optimized using an optimization algorithm, for example, the Levenberg-Marquardt algorithm. After block 802, the exemplary embodiment 618*a* proceeds to block 804.

At block 804, the server controller 26*a* determines the one of the plurality of aligned point clouds by shifting the point cloud by the offset calculated at block 802. After block 804, the exemplary embodiment 618*a* is concluded, and the exemplary embodiment 112*a* proceeds as discussed above.

The system 10 and method 100 of the present disclosure offer several advantages. Using the system 10 and method 100, lane line maps may be constructed from crowd-sourced data (i.e., data provided by many vehicles). The system 10 and method 100 allow data captured by different vehicles, with various equipment, at different times, in varying environmental conditions, and with varying data quality to be aggregated to produce accurate lane line maps. The lane line maps are subsequently used to update stored map databases and transmitted to vehicles for use by vehicle systems such as automated driving systems (ADS), advanced driver assistance systems (ADAS), and the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for crowd-sourcing lane line map data for a vehicle, the method comprising:
receiving a plurality of observations from one or more vehicles, wherein each of the plurality of observations includes a vehicle location trajectory and a plurality of points positioned relative to the vehicle location trajectory, and wherein each of the plurality of points corresponds to an object in an environment surrounding the one or more vehicles;
classifying the plurality of observations into a plurality of observation categories, wherein each of the plurality of observation categories includes at least one of the plurality of observations, wherein each of the plurality of observation categories includes a subset of the plurality of observations having at least one observation characteristic in common;
subsequent to classifying the plurality of observations into the plurality of observation categories, shifting the subset of the plurality of observations in each of the plurality of observation categories to generate a plurality of point clouds, wherein one of the plurality of point clouds corresponds to each of the plurality of observation categories;
subsequent to generating the plurality of point clouds, generating a plurality of aligned point clouds by aligning each of the plurality of point clouds to account for location drift introduced when shifting the subset of the plurality of observations in each of the plurality of observation categories;
determining a plurality of lane line maps based at least in part on the plurality of aligned point clouds, wherein one of the plurality of lane line maps corresponds to each of the plurality of aligned point clouds;
updating a map database based at least in part on the plurality of lane line maps; and
adjusting a path of the vehicle using an automated driving system based at least in part on the plurality of lane line maps.

2. The method of claim 1, wherein classifying the plurality of observations further comprises:
filtering the plurality of observations to remove outlier observations.

3. The method of claim 1, wherein receiving the plurality of observations further comprises:

receiving the plurality of observations from one or more vehicles, wherein each point of the plurality of points includes a plurality of point characteristics, wherein one of the plurality of point characteristics is a location of each point relative to the vehicle location trajectory.

4. The method of claim 3, wherein classifying the plurality of observations further comprises:
  determining at least one observation characteristic of each of the plurality of observations based at least in part on the plurality of point characteristics of each of the plurality of points of each of the plurality of observations; and
  classifying the plurality of observations based at least in part on the at least one observation characteristic, wherein each of the plurality of observation categories includes a subset of the plurality of observations having the at least one observation characteristic in common.

5. The method of claim 3, wherein classifying the plurality of observations further comprises:
  determining an average vehicle heading of each of the plurality of observations based at least in part on the plurality of point characteristics of each of the plurality of points of each of the plurality of observations; and
  classifying the plurality of observations based at least in part on the average vehicle heading of each of the plurality of observations, wherein each of the plurality of observation categories includes a subset of the plurality of observations having an average vehicle heading within a predetermined heading tolerance range.

6. The method of claim 3, wherein shifting the subset of the plurality of observations in one of the plurality of observation categories to generate one of the plurality of point clouds further comprises:
  identifying a first of the plurality of observations, wherein the first of the plurality of observations is in a first observation category of the plurality of observation categories;
  selecting a second of the plurality of observations, wherein the second of the plurality of observations is in the first observation category;
  aligning the second of the plurality of observations with the first of the plurality of observations by shifting the vehicle location trajectory of the second of the plurality of observations to produce a shifted vehicle location trajectory; and
  forming the one of the plurality of point clouds by repeating the selecting step and the aligning step until each of the plurality of observations of the first observation category have been aligned with the first of the plurality of observations, wherein the one of the plurality of point clouds includes the plurality of points of each of the plurality of observations of the first observation category, the vehicle location trajectory of the first of the plurality of observations, and a plurality of shifted vehicle location trajectories, wherein each of the plurality of shifted vehicle location trajectories corresponds to one of the plurality of observations of the first observation category.

7. The method of claim 6, wherein generating one of the plurality of aligned point clouds further comprises:
  calculating an offset k which minimizes an objective function:

$$f(k) = \sum_i [d(p_i, p'_i(k))]^2$$

wherein f(k) is a quantity to be minimized, $d(p_i, p'_i(k))$ is a Euclidean distance between points $p_i$ and $p'_i(k)$, $p_i$ is an ith point on the vehicle location trajectory of one of the plurality of observations in one of the plurality of point clouds, and $p'_i(k)$ is an ith point on a corresponding one of the plurality of shifted vehicle location trajectories in the one of the plurality of point clouds further shifted by the offset k; and
  determining the one of the plurality of aligned point clouds by shifting the one of the plurality of point clouds by the offset k.

8. The method of claim 6, wherein aligning the second of the plurality of observations with the first of the plurality of observations further comprises:
  determining a plurality of point pairs, wherein each of the plurality of point pairs includes one point from the first of the plurality of observations and one point from the second of the plurality of observations;
  calculating a plurality of offset vectors, wherein each of the plurality of offset vectors corresponds to one of the plurality of point pairs, wherein each of the plurality of offset vectors describes an offset between the one of the plurality of point pairs;
  calculating a plurality of offset weights, wherein each of the plurality of offset weights corresponds to one of the plurality of point pairs, and wherein each of the plurality of offset weights is calculated based at least in part on the plurality of point characteristics of each of the plurality of point pairs; and
  combining the second of the plurality of observations with the first of the plurality of observations by shifting the second of the plurality of observations towards the first of the plurality of observations based at least in part on the plurality of offset vectors and the plurality of offset weights, wherein the second of the plurality of observations is shifted towards the first of the plurality of observations using an iterative process, wherein the plurality of offset vectors and the plurality of offset weights are re-calculated upon each iteration of the iterative process, and wherein the iterative process is concluded when a magnitude of each of the plurality of offset vectors is less than or equal to a predetermined offset magnitude threshold.

9. The method of claim 8, wherein calculating one of the plurality of offset weights further comprises:
  comparing each of the plurality of point characteristics of a first point of one the plurality of point pairs with each of the plurality of point characteristics of a second point of the one of the plurality of point pairs to identify a plurality of common point characteristics between the first point of one the plurality of point pairs and the second point of the one of the plurality of point pairs; and
  calculating the one of the plurality of offset weights based at least in part on the plurality of common point characteristics.

10. The method of claim 9, wherein calculating the one of the plurality of offset weights based at least in part on the plurality of common point characteristics further comprises:
  determining a quantity of common point characteristics of the one of the plurality of point pairs based at least in part on the plurality of common point characteristics; and
  calculating the one of the plurality of offset weights based at least in part on the quantity of common point characteristics, wherein the one of the plurality of offset weights is proportional to the quantity of common point characteristics.

11. A system for crowd-sourcing lane line map data for a vehicle, the system comprising:
a server communication system;
a map database;
a server controller in electrical communication with the server communication system and the map database, wherein the server controller is programmed to:
receive a plurality of observations from one or more vehicles using the server communication system, wherein each of the plurality of observations includes a vehicle location trajectory and a plurality of points positioned relative to the vehicle location trajectory, wherein each point of the plurality of points includes a plurality of point characteristics, wherein one of the plurality of point characteristics is a location of each point relative to the vehicle location trajectory, and wherein each of the plurality of points corresponds to an object in an environment surrounding the one or more vehicles;
classify the plurality of observations into a plurality of observation categories, wherein each of the plurality of observation categories includes at least one of the plurality of observations;
determine a plurality of point clouds based at least in part on the plurality of observations, wherein one of the plurality of point clouds corresponds to each of the plurality of observation categories;
determine a plurality of aligned point clouds by shifting each of the plurality of point clouds by an offset to account for location drift introduced when determining each of the plurality of point clouds;
determine a plurality of lane line maps based at least in part on the plurality of aligned point clouds, wherein one of the plurality of lane line maps corresponds to each of the plurality of aligned point clouds;
update the map database based at least in part on the plurality of lane line maps; and
transmit the plurality of lane line maps to the one or more vehicles using the server communication system, wherein an automated driving system of the one or more vehicles adjusts a path of the one or more vehicles based at least in part on the plurality of lane line maps.

12. The system of claim 11, wherein to classify the plurality of observations, the server controller is further programmed to:
determine at least one observation characteristic of each of the plurality of observations based at least in part on the plurality of point characteristics of each of the plurality of points of each of the plurality of observations; and
classify the plurality of observations based at least in part on the at least one observation characteristic, wherein each of the plurality of observation categories includes a subset of the plurality of observations having the at least one observation characteristic in common.

13. The system of claim 11, wherein to determine one of the plurality of aligned point clouds, the server controller is further programmed to:
calculate an offset k which minimizes an objective function:

$$f(k) = \sum_i [d(p_i, p_i'(k))]^2$$

wherein $f(k)$ is a quantity to be minimized, $d(p_i, p_i'(k))$ is a Euclidean distance between points $p_i$ and $p_i'(k)$, $p_i$ is an ith point on the vehicle location trajectory of one of the plurality of observations in one of the plurality of point clouds, and $p_i'(k)$ is an ith point on a corresponding one of a plurality of shifted vehicle location trajectories in the one of the plurality of point clouds further shifted by the offset k; and
determine the one of the plurality of aligned point clouds by shifting the one of the plurality of point clouds by the offset k.

14. The system of claim 11, wherein to determine one of the plurality of point clouds, the server controller is further programmed to:
identify a first of the plurality of observations, wherein the first of the plurality of observations is in a first observation category of the plurality of observation categories;
select a second of the plurality of observations, wherein the second of the plurality of observations is in the first observation category;
align the second of the plurality of observations with the first of the plurality of observations by shifting the vehicle location trajectory of the second of the plurality of observations to produce a shifted vehicle location trajectory; and
form the one of the plurality of point clouds by repeating the selecting step and the aligning step until each of the plurality of observations of the first observation category have been aligned with the first of the plurality of observations, wherein the one of the plurality of point clouds includes the plurality of points of each of the plurality of observations of the first observation category, the vehicle location trajectory of the first of the plurality of observations, and a plurality of shifted vehicle location trajectories, wherein each of the plurality of shifted vehicle location trajectories corresponds to one of the plurality of observations of the first observation category.

15. The system of claim 14, wherein to align the second of the plurality of observations with the first of the plurality of observations, the server controller is further programmed to:
determine a plurality of point pairs, wherein each of the plurality of point pairs includes one point from the first of the plurality of observations and one point from the second of the plurality of observations;
calculate a plurality of offset vectors, wherein each of the plurality of offset vectors corresponds to one of the plurality of point pairs, wherein each of the plurality of offset vectors describes an offset between the one of the plurality of point pairs;
calculate a plurality of offset weights, wherein each of the plurality of offset weights corresponds to one of the plurality of point pairs, and wherein each of the plurality of offset weights is calculated based at least in part on the plurality of point characteristics of each of the plurality of point pairs; and
combine the second of the plurality of observations with the first of the plurality of observations by shifting the second of the plurality of observations towards the first of the plurality of observations based at least in part on the plurality of offset vectors and the plurality of offset weights, wherein the second of the plurality of observations is shifted towards the first of the plurality of observations using an iterative process, wherein the plurality of offset vectors and the plurality of offset weights are re-calculated upon each iteration of the iterative process, and wherein the iterative process is concluded when a magnitude of each of the plurality of offset vectors is less than or equal to a predetermined offset magnitude threshold.

16. The system of claim 15, wherein to calculate one of the plurality of offset weights, the server controller is further programmed to:
compare each of the plurality of point characteristics of a first point of one the plurality of point pairs with each of the plurality of point characteristics of a second point of the one of the plurality of point pairs to identify a plurality of common point characteristics between the first point of one the plurality of point pairs and the second point of the one of the plurality of point pairs; and
calculate the one of the plurality of offset weights based at least in part on the plurality of common point characteristics.

17. The system of claim 16, wherein to calculate the one of the plurality of offset weights based at least in part on the plurality of common point characteristics, the server controller is further programmed to:
determine a quantity of common point characteristics of the one of the plurality of point pairs based at least in part on the plurality of common point characteristics; and
calculate the one of the plurality of offset weights based at least in part on the quantity of common point characteristics, wherein the one of the plurality of offset weights is proportional to the quantity of common point characteristics.

18. A system for crowd-sourcing lane line map data for a vehicle, the system comprising:
a vehicle system including:
a camera system;
a global navigation satellite system (GNSS);
a vehicle communication system; and
a vehicle controller in electrical communication with the camera system, the GNSS, and the vehicle communication system, wherein the vehicle controller is programmed to:
perform a plurality of observations of one or more lane lines on a roadway with the camera system and the GNSS, wherein the plurality of observations includes a vehicle location trajectory determined by the GNSS and a plurality of points positioned relative to the vehicle location trajectory, wherein each point of the plurality of points includes a plurality of point characteristics, and wherein the plurality of points forms a point cloud which describes one or more lane lines;
transmit the plurality of observations to a server system;
receive a lane line map from the server system using the vehicle communication system; and
adjust a path of the vehicle based at least in part on the lane line map; and
the server system including:
a server communication system;
a server controller in electrical communication with the server communication system, wherein the server controller is programmed to:
receive the plurality of observations using the server communication system;
classify the plurality of observations into a plurality of observation categories, wherein each of the plurality of observation categories includes at least one of the plurality of observations, wherein each of the plurality of observation categories includes a subset of the plurality of observations having at least one observation characteristic in common;
subsequent to classifying the plurality of observations into the plurality of observation categories, shift the subset of the plurality of observations in each of the plurality of observation categories to generate a plurality of point clouds, wherein one of the plurality of point clouds corresponds to each of the plurality of observation categories;
subsequent to generating the plurality of point clouds, generate a plurality of aligned point clouds by shifting each of the plurality of point clouds by an offset to account for location drift introduced when shifting the subset of the plurality of observations in each of the plurality of observation categories;
determine a plurality of lane line maps based at least in part on the plurality of aligned point clouds, wherein one of the plurality of lane line maps corresponds to each of the plurality of aligned point clouds; and
transmit one or more of the plurality of lane line maps to the vehicle using the server communication system.

19. The system of claim 18, wherein to determine one of the plurality of point clouds, the server controller is further programmed to:
identify a first of the plurality of observations;
select a second of the plurality of observations;
align the second of the plurality of observations with the first of the plurality of observations by shifting the vehicle location trajectory of the second of the plurality of observations to produce a shifted vehicle location trajectory; and
form the one of the plurality of point clouds by repeating the selecting step and the aligning step until each of the plurality of observations have been aligned with the first of the plurality of observations, wherein the one of the plurality of point clouds includes the plurality of points of each of the plurality of observations, the vehicle location trajectory of the first of the plurality of observations, and a plurality of shifted vehicle location trajectories, wherein each of the plurality of shifted vehicle location trajectories corresponds to one of the plurality of observations.

20. The system of claim 19, wherein to align the second of the plurality of observations with the first of the plurality of observations, the server controller is further programmed to:
determine a plurality of point pairs, wherein each of the plurality of point pairs includes one point from the first of the plurality of observations and one point from the second of the plurality of observations;
calculate a plurality of offset vectors, wherein each of the plurality of offset vectors corresponds to one of the plurality of point pairs, wherein each of the plurality of offset vectors describes an offset between the one of the plurality of point pairs;

calculate a plurality of offset weights, wherein each of the plurality of offset weights corresponds to one of the plurality of point pairs, and wherein each of the plurality of offset weights is calculated based at least in part on the plurality of point characteristics of each of the plurality of point pairs; and combine the second of the plurality of observations with the first of the plurality of observations by shifting the second of the plurality of observations towards the first of the plurality of observations based at least in part on the plurality of offset vectors and the plurality of offset weights, wherein the second of the plurality of observations is shifted towards the first of the plurality of observations using an iterative process, wherein the plurality of offset vectors and the plurality of offset weights are re-calculated upon each iteration of the iterative process, and wherein the iterative process is concluded when a magnitude of each of the plurality of offset vectors is less than or equal to a predetermined offset magnitude threshold.

* * * * *